United States Patent [19]

Strobel et al.

[11] Patent Number: 5,753,754
[45] Date of Patent: May 19, 1998

[54] FLAME-TREATING PROCESS

[75] Inventors: Mark A. Strobel, Maplewood, Minn.; Melvyn C. Branch, Boulder, Colo.; Ronald S. Kapaun, Woodbury; Christopher S. Lyons, St. Paul, both of Minn.

[73] Assignee: Minnesota Mining & Manufacturing Company, St. Paul, Minn.

[21] Appl. No.: 713,931

[22] Filed: Sep. 13, 1996

Related U.S. Application Data

[63] Continuation-in-part of Ser. No. 637,566, Apr. 25, 1996, abandoned.

[51] Int. Cl.$^6$ .................................................. C08F 8/30
[52] U.S. Cl. ................ 525/61; 525/329.9; 525/330.5; 525/333.6; 525/333.7; 525/374; 525/375; 525/376; 525/383; 525/419; 525/420; 525/437
[58] Field of Search .......................... 525/374, 375, 525/376, 383, 61, 419, 420, 437

[56] References Cited

U.S. PATENT DOCUMENTS

| | | | |
|---|---|---|---|
| 3,153,683 | 10/1964 | Bryan et al. | 264/80 |
| 3,153,684 | 10/1964 | Bryan et al. | 264/80 |
| 3,255,034 | 6/1966 | Covington et al. | 117/47 |
| 3,335,022 | 8/1967 | Sincock | 117/46 |
| 3,347,697 | 10/1967 | Gmitro | 117/46 |
| 3,361,607 | 1/1968 | Bruno | 156/82 |
| 3,364,056 | 1/1968 | Seibel | 117/46 |
| 3,375,126 | 3/1968 | Nagel | 117/46 |
| 3,431,135 | 3/1969 | Keane et al. | 117/46 |
| 3,661,735 | 5/1972 | Drelich | 204/165 |
| 3,708,362 | 1/1973 | Winchcombe et al. | 156/82 |
| 3,783,062 | 1/1974 | Martin | 156/82 |
| 3,853,584 | 12/1974 | Tatsuta | 117/34 |
| 3,870,461 | 3/1975 | Wise | 432/11 |
| 3,883,336 | 5/1975 | Randall | 65/18 |
| 3,900,538 | 8/1975 | Kawakami et al. | 264/22 |
| 4,186,018 | 1/1980 | Minagawa | 430/532 |
| 4,432,820 | 2/1984 | Thompson | 156/82 |
| 4,622,237 | 11/1986 | Lori | 427/40 |
| 4,902,539 | 2/1990 | Jackson | 427/423 |

FOREIGN PATENT DOCUMENTS

| | | |
|---|---|---|
| 4-59344 A | 2/1992 | Japan . |
| 4-7337 | 4/1992 | Japan . |

*Primary Examiner*—Bernard Lipman
*Attorney, Agent, or Firm*—Roger R. Tamte

[57] ABSTRACT

The present invention provides a method of modifying the surface of a polymeric substrate, e.g., to improve the wettability of the polymer film surface and/or alter the reactivity of the surface of the substrate by further oxidation or affixation of nitrogen, comprising exposing the substrate to a flame. The flame is supported by a fuel and oxidizer mixture that includes an effective amount, for modifying the polymeric substrate, of at least one compound that functions as a fuel or oxidizer substitute and is selected from an oxygen-containing compound, in which the oxygen comprises between about 10 and 50 atomic percent of the compound, a nitrogen-containing compound or an oxygen-nitrogen-containing compound. In a preferred embodiment, which affixes nitrogen or nitrogen-containing chemical groups onto the surface of the film, the flame is supported by a fuel and oxidizer mixture that includes ammonia, nitrous oxide, nitric oxide or a mixture thereof in an effective amount. Large increases in the ASTM wetting test, e.g., greater than 13 mJ/m$^2$ over that reported with conventional flame-treating processes, have been observed in films treated according to this invention. In addition, significant increases in polymer film surface oxidation levels, e.g., as much as 55 percent, have been observed, as have significant amounts of nitrogen and nitrogen-containing chemical groups affixed to film surfaces.

14 Claims, No Drawings

FLAME-TREATING PROCESS

CROSS REFERENCE TO RELATED APPLICATION

This application is a continuation-in-part of application Ser. No. 08/637,566, filed Apr. 25, 1996, now abandoned, which is incorporated herein by reference.

FIELD OF THE INVENTION

This invention relates to a method of flame treating polymeric substrates to modify the surface properties of the substrate and to articles treated by the method.

BACKGROUND OF THE INVENTION

Flame treating is used to improve the wetting and adhesion properties of polymer film surfaces in general and of polyolefin film surfaces in particular. The most wettable surface-modified polymer films usually have optimal adhesion properties in a variety of practical applications. These enhanced wetting properties result in improved coatability and adhesion of materials such as pressure-sensitive adhesives, primers and low-adhesion release coatings. Enhanced wetting properties are particularly useful in coating water-borne solutions at all film speeds and in coating solvent-borne materials at high coating speeds.

Flame treaters ordinarily use premixed flames, i.e., the fuel and oxidizer are thoroughly mixed prior to combustion and the rate of combustion is controlled by the rate of chemical reaction that occurs in the flame. In a premixed flame, the luminous region is that portion of the flame where the temperature rise is the greatest and where much of the reaction and heat release occur. During a flame-treating process, one side of a polymer film is passed in close proximity to a flame while the other side of the polymer surface generally passes over a cooled support, e.g., a cooled drum, to minimize heat distortion.

Flames are commonly described in terms of two characteristics: the flame power and the molar ratio of oxidizer to fuel. The flame power is the product of the volume of fuel burned per unit time and the heat content of the fuel. Typical units for the flame power are W or Btu/hr. In flame treating, the flame power can be normalized to account for the dimensions of the burner, leading to units such as $W/cm^2$ or $Btu/hr-in^2$. The exact ratio of oxidizer to fuel needed for complete combustion is known as the stoichiometric ratio. For example, the exact amount of dry air necessary for the complete combustion of methane is 9.55 volumes per volume of methane; so the stoichiometric ratio for an air:methane flame is 9.55:1. The equivalence ratio is defined as the stoichiometric oxidizer:fuel ratio divided by the actual oxidizer:fuel ratio. For fuel lean, or oxidizing, flames, there is more than the stoichiometric amount of oxidizer and so the equivalence ratio is less than 1:1. For oxidizer:fuel mixtures at the stoichiometric ratio, the equivalence ratio is equal to 1:1. For fuel-rich systems, the equivalence ratio is greater than 1:1.

Virtually all industrial flame treaters use a premixed laminar (as opposed to turbulent) flame with air as the oxidizer and a gaseous hydrocarbon as a fuel. Typical hydrocarbon fuels include hydrogen, natural gas, methane, ethane, propane, butane, ethylene, liquefied petroleum gas, acetylene, or blends thereof, and city gas, which is often composed of a mixture of carbon dioxide, carbon monoxide, hydrogen, methane, and nitrogen. While carbon monoxide is also listed as a fuel in one patent, carbon monoxide does not burn in a steady flame with dry air as an oxidizer. Halogen and halogen-containing compounds have also been disclosed as oxidizer:fuel mixture additives to increase the adhesivity of polyolefin films to subsequent coatings.

Recently, hydrocarbon flames enriched with up to 5 percent additional oxygen by volume, up to 5 percent steam by weight and a few parts per million of alkali or alkaline earth metals have demonstrated increases in wetting values on polymer films (American Standard Test Methods (ASTM) standard wetting test) of up to 2 $mJ/m^2$ relative to a non-enriched flame process. Surface modification of a polymer surface has also been reported by flame treatment where a flammable third component that is neither a fuel nor an oxidizer is sprayed into the flame. The listed third components are polymers such as cellulose, protein, silicones or polyethers, and inorganic materials such as carbides, nitrides, metal salts or metal oxides. While carbon monoxide and nitrogen oxide plasmas and coronas are well known for improving the wettability of polymer films, plasma and corona processes are limited by their tendency to perforate thin or porous films, to "strike through" or inadvertently treat the backside of polymer films, and to create toxic or corrosive gases.

Because of the benefit that the increased wettability of polymer surfaces has on the coating industry, there is an ongoing need for processes that improve the wettability of polymer films.

SUMMARY OF THE INVENTION

The present invention provides a method of modifying the surface of a polymeric substrate, e.g., to improve the wettability of the polymer substrate surface and/or to alter the reactivity of the substrate surface by further oxidation and/or affixation of nitrogen. The method of the invention comprises exposing the substrate to a flame that is supported by a fuel and oxidizer mixture that includes an effective amount, for modifying the polymeric substrate, of at least one compound that functions as a fuel substitute or an oxidizer substitute and is selected from an oxygen-containing compound, a nitrogen-containing compound or an oxygen-nitrogen-containing compound. Oxygen in the oxygen-containing compound comprises between about 10 and 50 atomic percent of the compound.

In a preferred embodiment, in which nitrogen or nitrogen-containing chemical groups are affixed onto the surface of the film, the flame is supported by a fuel and oxidizer mixture that includes ammonia, nitrous oxide, nitric oxide or a mixture thereof in an amount effective to modify the surface. Preferably this amount is at least about one molar percent where "molar percent" is equal to 100 times the molar flow of the compound to the flame divided by the sum of the molar flow of the compound and the molar flow of the fuel.

This invention also provides novel articles having surfaces modified by the described method in which at least one nitrogen-containing compound or oxygen-nitrogen-containing compound functions as a fuel substitute or an oxidizer substitute. The articles include oxidized nitrogen groups on the modified surface.

Large increases in the ASTM wetting test, e.g., greater than 13 $mJ/m^2$ over that reported with conventional flame-treating processes, have been observed in polymeric substrates treated according to this invention. In addition, significant increases in polymeric substrate surface oxidation levels, e.g., as much as 55 percent, have been observed, as have significant amounts of nitrogen and nitrogen-containing chemical groups affixed to polymeric substrate surfaces.

DETAILED DESCRIPTION OF THE INVENTION

Polymeric substrate surfaces that are more wettable, more oxidized or have more nitrogen or nitrogen-containing chemical groups attached to them are useful in the coating industry. Polymeric substrate surfaces that are more wettable generally permit a more intimate contact with subsequent coating solutions, suspensions or dispersions and thus cause them to be more easily coated onto the polymeric substrate surface. The improved contact also often results in improved adhesion between the polymeric substrate surface and the coating once the coating is dried. Polymeric substrate surfaces that are more oxidized are generally more reactive toward some chemical species and less reactive toward others. This reactivity can be beneficial depending on the application. In addition, increased hydrogen-bonding forces resulting from the increased surface oxidation usually permit subsequent coatings to be more easily applied and adhered to the film surface. Polymeric substrate surfaces that are affixed with nitrogen or nitrogen-containing species or chemical groups tend to be more reactive toward a variety of subsequent coatings.

The invention is useful with a wide range of polymeric substrates that can be oxidized or have additional nitrogen or nitrogen-containing chemical groups affixed to them. The polymeric substrates can be of any shape that permits surface modification by flame treatment and include, for example, films, sheets, molded shapes, machined or fabricated parts, porous or nonwoven materials, three-dimensional objects, foams, fibers and fibrous structures. Such polymeric substrates include, for example, polyolefins, such as polyethylene, polypropylene, polybutylene, polymethylpentene; mixtures of polyolefin polymers and copolymers of olefins; polyolefin copolymers containing olefin segments such as poly(ethylene vinylacetate), poly(ethylene methacrylate) and poly(ethylene acrylic acid); polyesters, such as poly(ethylene terephthalate), poly(butylene phthalate) and poly(ethylene naphthalate); acetates such as cellulose acetate, cellulose triacetate and cellulose acetate/butyrate; polyamides such as poly(hexamethylene adipamide); polyurethanes; polycarbonates; acrylics such as poly(methyl methacrylate); polystyrenes and styrene-based copolymers; vinylics such as poly(vinyl chloride), poly(vinylidone dichloride), poly(vinyl alcohol) and poly(vinyl butyral); ether oxide polymers such as poly(ethylene oxide) and poly(methylene oxide); ketone polymers such as poly-etheretherketone; silicones such as polydimethylsiloxane; epoxies; polyimides; mixtures thereof, or copolymers thereof.

Flame-treating equipment useful for the invention is any that can provide a flame in close proximity to the polymeric substrate surface, thus modifying the characteristics of the polymer surface. Generally, when the polymeric substrate is a film, the film surface is flame-treated as the film passes over a cooled support, e.g., a cooled roll, to prevent film distortion. However, cooling rolls are not necessary. For example, the film may be sufficiently cooled by being suspended between two supports. Flame-treating equipment includes commercial systems manufactured by, for example, The Aerogen Company, Ltd., Alton, United Kingdom, and Sherman Treaters Ltd., Thame, United Kingdom. Preferably the equipment has a mixer to combine the oxidizer and fuel before they feed the flame used in the flame-treating process of the invention. A ribbon burner is best suited for the flame treatment of polymer films, but other types of burners may also be used.

The flame has an optimal distance from the polymeric substrate surface and is supported by mixture of oxidizer and fuel. The distance between the tip of the luminous cone of the flame and the surface of the polymeric substrate has an effect on the degree of surface-property enhancement that is observed. Generally, useful distances are less than 30 mm and can be as low as −2 mm, i.e., the film is contacted by the flame and occupies space that would otherwise comprise the terminal 2 mm of the flame tip. Preferably the distance is between 0 mm and 10 mm and more preferably between 0 mm and 2 mm. The fuel has a lower electronegativity than the oxidizer. Suitable fuels include, for example, natural gas, methane, ethane, propane, butane, ethylene, liquefied petroleum gas, acetylene or blends thereof. The oxidizer reacts exothermically with the fuel to form chemical species that are more thermodynamically stable. Suitable oxidizers are air and oxygen-enriched air.

The compound that is included in the oxidizer:fuel mixture may be one of three types: (1) containing oxygen, (2) containing nitrogen or (3) containing both oxygen and nitrogen. More than one compound from more than one type of compound may be used. The compound may replace some or all of the fuel or some or all of the oxidizer and be a fuel-substitute or an oxidizer-substitute, respectively. When oxygen-containing compounds are used, the oxygen in the oxygen-containing compound comprises between about 10 percent and 50 percent atomic oxygen. The oxygen-containing compound may be either organic or inorganic. Suitable organic compounds include, for example, alcohols such as methyl alcohol and ethyl alcohol; ketones such as acetone; ethers such as dimethyl ether; aldehydes such as formaldehyde, acetaldehyde and propanal; acids such as formic acid, ethanoic acid, propanoic acid, butanoic acid and pentanoic acid; esters such as methyl formate, methyl acetate and ethyl acetate, and epoxides such as ethylene oxide and propylene oxide. Preferably the organic compounds are methyl alcohol, ethyl alcohol, acetone, dimethyl ether, formaldehyde, acetaldehyde, propanal, formic acid, ethanoic acid, propanoic acid, butanoic acid, pentanoic acid, methyl formate, methyl acetate, ethyl acetate, ethylene oxide and propylene oxide. Suitable inorganic compounds include, for example, carbon monoxide. Preferably the oxygen-containing compounds are dimethyl ether and carbon monoxide. Oxygen-containing compounds that are gases at room temperature and pressure are easier to premix with other materials into the oxidizer-:fuel mixture than oxygen-containing compounds that are liquids at room temperature.

The nitrogen-containing compound also may be either organic or inorganic. Suitable organic compounds include, for example, amines such as monomethylamine, dimethylamine, monoethylamine and trimethylamine. Suitable inorganic compounds include, for example, ammonia; cyanides such as hydrogen cyanide; hydrazine; hydrazoic acid and cyanogen. Preferably the nitrogen-containing compound is ammonia. Nitrogen-containing compounds that are gases at room temperature and pressure are easier to premix with other materials into the oxidizer : fuel mixture than nitrogen-containing compounds that are liquids at room temperature.

The oxygen-nitrogen-containing compound is generally inorganic. Suitable inorganic compounds include, for example, nitrogen oxides such as nitrous oxide, nitric oxide, nitrogen dioxide, nitrous acid, and nitric acid. Preferably the oxygen-nitrogen-containing compound is nitrous oxide. Oxygen-nitrogen-containing compounds that are gases at room temperature and pressure are easier to premix with other materials into the oxidizer:fuel mixture than nitrogen-containing compounds that are liquids at room temperature.

The effective amount of compound needed to modify the surface of a polymer substrate can be less than one molar percent up to 100 molar percent and will depend on the compound used and the effects desired. The amount of compound used is expressed in terms of molar percent which is defined as 100 times the molar flow of the compound divided by the sum of the molar flow of the compound and the molar flow of the fuel. Surprisingly, the amount of the compound that results in an enhanced modification of the film surface varies from less than one molar percent to as much as 100 molar percent, depending on the compound used. Compounds (such as ammonia) that form larger amounts of reactive radicals when present in a flame result in significant increases in wettability values at molar percents of less than one molar percent. Compounds (such as dimethyl ether) able to react exothermically with oxygen can thus be fuel substitutes and replace fuel. If all of the fuel were replaced with such an oxygen-containing compound, the molar percent of the oxygen-containing compound would be 100 percent. Also, compounds that are able to oxidize fuels can be oxidizer substitutes and replace oxidizer. If all of the oxidizer were replaced with such a compound, the molar percent of the compound would depend on the stoichiometric ratio for complete combustion of the oxidizer:fuel mixture and would be less than 100 percent.

The optimal concentrations of oxidizer, fuel and compound in the oxidizer:fuel:compound mixture are determined by calculating the stoichiometric ratio of the blend and experimentally determining the equivalence ratio that is optimal for the particular materials used. Typically, the accuracy of the equivalence ratio is within 0.02 of the recorded value. First, the stoichiometric ratio of oxidizing material to oxygen-reactive material, or oxidizer to fuel, is calculated for the complete combustion of the materials in the oxidizer:fuel:compound mixture. Then the optimal equivalence ratio, defined as the stoichiometric oxidizer:fuel ratio divided by the actual oxidizer:fuel ratio that results in optimal surface modification, is experimentally determined. For example, the stoichiometric ratio for the combustion of dimethyl ether by air is 14.32:1, based on the reaction: $CH_3OCH_3+3O_2 \rightarrow 2CO_2+3H_2O$ and a molar concentration of oxygen in dry air of 20.95 percent, and the optimal equivalence ratio is about 0.93; the stoichiometric ratio for the combustion of carbon monoxide by air in the presence of methane is 2.39:1, based on the reaction: $2CO+O_2 \rightarrow 2CO_2$, and the optimal equivalence ratio is also about 0.93; the stoichiometric ratio for the combustion of methane by nitrous oxide is 4:1, based on the reaction: $CH_4+4N_2O \rightarrow 4N_2+2H_2O+CO_2$, and the optimal equivalence ratio is about 1.00; the stoichiometric ratio for the combustion of ammonia by air is 3.58:1, based on the reaction: $4NH_3+3O_2 \rightarrow 2N_2+6H_2O$, and the optimal equivalence ratio is about 1.00.

Some oxygen-containing compounds are particularly useful in enhancing the surface properties of flame-treated polymer films. For example, dimethyl ether is a fuel substitute that enhances the wettability of and further oxidizes the surface of flame-treated polymer films when used over a range of molar percents from about 1.7 to 100. Dimethyl ether is useful because it is a gas that is easily mixed with the oxidizer:fuel mixture. Carbon monoxide is a fuel substitute that enhances the wettability and further oxidizes the surface of flame-treated polymer films when used over a range of molar percents from about 3 to about 98. This is surprising because a mixture of dry air and pure carbon monoxide does not readily support a flame. When used in the flame-treating process of the invention, carbon monoxide has the same advantages as dimethyl ether as well as the advantage of being effectively consumed in the flame and therefore having no toxic by-products or residual carbon monoxide; these advantages are not present when carbon monoxide is used in a corona-treating process.

In addition, some nitrogen-containing compounds are particularly useful in enhancing the surface properties of flame-treated polymers. For example, ammonia is a fuel substitute that enhances the wettability of and affixes nitrogen to the surface of flame-treated polymeric substrates. Effective amounts useful for enhancing wettability range from less than one molar percent to about 13 molar percent. Effective amounts useful for affixing nitrogen to the surface range from less than one molar percent to about 30 molar percent. Ammonia is particularly useful because additions as low as less than one molar percent result in an increase in wettability of up to 10 mJ/m$^2$. It is surprising that such small additions of ammonia cause such large increases in wettability.

Also, some oxygen-nitrogen-containing compounds are particularly useful in enhancing the surface properties of flame-treated polymers. For example, ammonia is a fuel substitute that enhances the wettability of and affixes nitrogen to the surface of flame-treated polymer substrates. Nitrous oxide is an oxidizer substitute that modifies the surface of flame-treated polymer substrates by not only enhancing the wettability of the surface but both further oxidizing the surface to higher levels than either dimethyl ether or carbon monoxide and causing the flame-treated surface to have additional nitrogen and/or nitrogen-containing chemical groups affixed thereon. It can be used over a range of molar percents from about 1 to about 80, the latter if all of the oxidizer is replaced by nitrous oxide. Nitrous oxide has essentially the same advantages as dimethyl ether and carbon monoxide as well as two others: (1) nitrous oxide is much less toxic than carbon monoxide and (2) additions of even small amounts of nitrous oxide to the flame change the color of the flame from bluish to yellowish white, thereby enabling easy visual monitoring of the flame. Nitrous oxide also affixes nitrogen over a broader effective range and to a higher level than ammonia.

The differences between the effects of ammonia and nitrous oxide are believed to occur because even though the gas-phase free radicals present in ammonia-containing flames and nitrous oxide-containing flames are identical in kind, the temperature of the two flames are different. Nitrous oxide additions to a flame raise the flame temperature while ammonia additions to a flame decrease the flame temperature. The higher temperatures of the nitrous oxide-containing flames are believed to lead to greater numbers of active free radicals and therefore enhanced treatment at all nitrous oxide concentrations. With ammonia additions to the flame, small amounts of ammonia generate nitrogen-affixing radicals that are beneficial for flame treatment but large additions of ammonia may cool the flame so much that the overall numbers of free radicals in the flame decrease and treatment effectiveness thereby also decreases.

Polymeric substrates modified by the flame treating process where the flames are supported by the nitrogen-containing compounds are unique. These modified substrates exhibit enhanced wettability, high levels of surface oxidation, and the presence of both oxidized-nitrogen (organic nitrates and/or nitrites) and reduced-nitrogen (amine, amide, imine and/or nitrile) functionalities. The presence of both types of nitrogen-containing functionalities is particularly surprising because other nitrogen-affixing processes, such as plasma or corona treatment, only generate reduced-nitrogen functionalities.

This invention is further illustrated by the following examples which are not intended to limit the scope of the invention. The following test methods were used to evaluate and characterize film surfaces produced in the examples.

Advancing and Receding Contact Angles

Measurements of the advancing and receding contact angles in air of deionized, filtered water were made using the Wilhelmy plate method on a Cahn DCA-322 dynamic contact-angle instrument. The surface tension of the water was measured as 72.6 mN/m at 21° C. using the microbalance. A three-layer laminate was prepared using SCOTCH BRAND™ No. 666 double-coated tape to mount the treated sides of the film outward. To prevent contamination during the preparation of this laminate, the treated surfaces contacted only untreated polypropylene film. This situation is analogous to the common practice of winding modified film into roll form after treatment. The laminate was cut into a 2.5×2.5 cm square for analysis. The stage speed was 49.8 μm/s with a travel distance of about 1 cm. The advancing and receding contact angles were calculated using a software routine supplied with the Cahn instrument that uses linear-regression for the buoyancy correction. Typical standard deviations for the contact-angle measurements were 2°–3°.

ASTM D-2578-84 Wetting Test

Measurement of the wetting tension of a polymer film surface is made by wiping a series of liquids of different surface tensions over different regions of the surface of a polymer film sample. The wetting tension of the film surface is approximated by the surface tension of the liquid that just wets the film surface. The untreated polypropylene films used in this study had an ASTM wetting test value of 29 mJ/m$^2$. The typical standard deviation for the ASTM wetting test was ±2 mJ/m$^2$. Results are the average of six samples unless otherwise noted.

Surface Composition Determination

X-ray photoelectron spectroscopy (XPS or ESCA) spectra were obtained on a Hewlett-Packard Model 5950B spectrometer using a monochromatic AlK$_\alpha$ photon source at an electron take-off angle with respect to the surface of 38°. Spectra were referenced with respect to the 285.0 eV carbon 1s level observed for hydrocarbon. From the ESCA spectra, O/C and N/C atomic ratios were obtained. The typical standard deviation of the O/C and N/C atomic ratios obtained from ESCA was ±0.02.

EXAMPLES 1–10 AND COMPARATIVE EXAMPLES C1–C6

In Example 1, an oxidizer composed of dust-filtered, 25° C. compressed air with a dew point of <–10° C. was premixed with the components of a fuel mixture composed of 97.1 molar percent of a natural gas fuel (having a specific gravity of 0.577, a stoichiometric ratio of dry air: natural gas of 9.6:1, and a heat content of 37.7 kJ/L) and 2.9 molar percent of an oxygen-containing compound containing 50 atomic percent oxygen (industrial-grade carbon monoxide fuel with a stoichiometric ratio for dry air:carbon monoxide of 2.39:1 and a heat content of 12.0 kJ/L) in a venturi mixer, Flowmixer Model 88-9 available from Pyronics Inc., Cleveland, Ohio, to form a combustible mixture. The flows of the air, natural gas, and carbon monoxide were measured with Brooks Instrument Model 5812 (8–400 Lpm), Brooks Instrument Model 5811 (1–50 Lpm), and Tylan General Model FC-2921JV (1–100 Lpm) mass flowmeters, respectively. The mass flowmeters were calibrated using in-line Rockwell International cumulative-flow meters that operate on the displacement principle. The natural gas and air flows were controlled with Badger Meter Inc. control valves while the carbon monoxide flow was controlled with a valve integral to the Tylan General mass flowmeter. All flows were adjusted to result in a flame equivalence ratio of 0.93 and a normalized flame power of 500 W/cm$^2$. The combustible mixture passed through a 3 m long pipe to a ribbon burner, a 35 cm×1 cm stainless steel ribbon mounted in a cast-iron housing and available as Part No. FMB-206 from The Aerogen Company Ltd., Alton, United Kingdom.

The burner was mounted beneath a 25 cm diameter, 40 cm face-width, steel chill roll, available from American Roller Company, Kansasville, Wis., with an ARCOTHERM™ TC-100 ceramic coating and water-cooled to 30° C. An electric spark ignited the combustible mixture. Stable conical flames were formed with tips 2–3 mm above the topmost surface of the ribbon burner. Thermally extruded, biaxially oriented 0.05 mm (2 mil) thick, 30 cm wide homopolymer polypropylene (PP) film, moving at 125 m/min, was guided by idler rolls to wrap around the bottom half of the chill roll. The distance between the uppermost surface of the ribbon burner and the chill roll was adjusted to maintain a distance of 1±1 mm between the tips of the luminous stable flame cones and the surface of the polypropylene film. To ensure intimate contact between the substrate and the chill roll, a 10 cm diameter, 40 cm face-width nip roll, covered with 80–90 durometer urethane rubber and available from American Roller Company, was located at the 9 o'clock position on the input side of the chill roll as the film moves from left to right. The front side of the PP film was flame treated by exposure to a laminar premixed flame while the backside was cooled by contact with the chill roll. The actual zone of reactive product gases is somewhat wider than the ribbon-burner downweb dimension of 1 cm. In fact, the plume of reactive product gases tends to be about 4 cm in the downweb direction. Using this value as the dimension of the visible flame, the exposure time of the polypropylene film to the flame is about 0.02 seconds.

In Examples 2–10, polypropylene films were flame treated as in Example 1 except that the fuel mixtures contained different amounts of carbon monoxide (CO) ranging from 4.7 molar percent to 97.8 molar percent, as listed in Table 1. In Comparative Example C1, polypropylene film was not flame treated. In Comparative Example C2, polypropylene film was flame treated as in Example 1 except that the fuel mixture only contained natural gas. In Comparative Examples C3–C6, polypropylene film was flame treated as in Example 1 except that the fuel mixtures contained different amounts of carbon monoxide ranging from 99.0 molar percent to 100.0 molar percent, as listed in Table 1.

All film samples were tested with the ASTM wetting test and select films were tested with the advancing and receding contact-angle test and ESCA. The results are shown in Table 1.

TABLE 1

| Example | CO (Percent) | Wetting (mJ/m²) | Advancing Angle (Degrees) | Receding Angle (Degrees) | ESCA O/C Ratio |
|---|---|---|---|---|---|
| C1 | none | 29 | 117 | 85 | 0.0 |
| C2 | none | 61 | 89 | 28 | 0.11 |
| 1 | 2.9 | 62 | — | — | — |
| 2 | 4.7 | 66 | 87 | 21 | 0.11 |
| 3 | 9.1 | 67 | — | — | — |
| 4 | 13.8 | 68 | — | — | — |
| 5 | 17.4 | 70 | — | — | — |
| 6 | 50.0 | 71 | — | — | — |
| 7 | 59.9 | ≧72 | 77 | 12 | 0.15 |
| 8 | 68.5 | 71 | — | — | — |
| 9 | 95.9 | 70 | 79 | 16 | 0.16 |
| 10 | 97.8 | 66 | — | — | — |
| C3 | 99.0 | 58 | — | — | — |
| C4 | 99.4 | 56 | 96 | 32 | 0.08 |
| C5 | 99.7 | 44 | 96 | 42 | 0.04 |
| C6 | 100 | Does not burn as a stable flame | | | |

As seen in Table 1, the wettability of polypropylene treated in a pure natural gas flame was 61 mJ/m², while the wettability of the polypropylene treated in the nearly pure carbon monoxide flame was only 44 mJ/m². However, films treated with carbon monoxide added to the flame had wettabilities superior to that obtained with the pure natural gas flames at all fuel compositions from about 2 molar percent to about 98 molar percent carbon monoxide. This improvement was surprising because of the poor wettabilities obtained with the nearly pure carbon monoxide flames.

As seen in Comparative Examples C3–C6, flame-treating with flames supported by a fuel comprising pure or nearly pure carbon monoxide did not result in enhanced surface properties over that of flames supported by fuels comprising pure natural gas. With dry air as an oxidizer, pure carbon monoxide did not readily burn in a stable flame. Small amounts of hydrocarbon were needed to enable carbon monoxide to burn in a stable flame. However, although stable flames were observed at carbon monoxide amounts of less than 99.7 molar percent, enhanced surface properties over natural gas flame treating were not observed until the carbon monoxide was below 99.0 molar percent.

The optimal molar percentage of carbon monoxide was about 60 percent. At this optimal fuel composition, the improvement over the standard hydrocarbon flame was over 10 mJ/m². Relatively small additions of carbon monoxide led to significant improvements in the wettability of treated polypropylene. For example, the addition of only 4.7% carbon monoxide to a standard natural gas flame yielded an improvement in the ASTM wetting test value of 5 mJ/m². The effectiveness of the carbon monoxide additive was also reflected in the contact angle and ESCA data. The contact angles of water on the polypropylene flame treated at the optimal percentage of carbon monoxide were significantly lower than on the polypropylene treated in the standard natural gas flame. The ESCA O/C atomic ratios of the flame-treated polypropylene films also showed the greater levels of surface oxidation associated with the use of a carbon monoxide flame additive.

EXAMPLES 11–21

The polypropylene films of Examples 11–14 were flame treated as in Example 2 except that the equivalence ratios were varied from 0.975 to 0.90 as shown in Table 2. The polypropylene films of Examples 15–21 were flame treated as in Example 7 except the equivalence ratios were varied from 1.00 to 0.85 as shown in Table 2. All film samples were tested with the ASTM wetting test and the results are shown in Table 2.

TABLE 2

| Example | Equivalence Ratio | Wetting in mJ/m² |
|---|---|---|
| 11 | 0.975 | 60 |
| 12 | 0.95 | 62 |
| 13 | 0.93 | 64 |
| 14 | 0.90 | 59 |
| 15 | 1.00 | 50 |
| 16 | 0.975 | 66 |
| 17 | 0.95 | 70 |
| 18 | 0.93 | 72 |
| 19 | 0.90 | 70 |
| 20 | 0.875 | 69 |
| 21 | 0.85 | 66 |

As shown in Table 2, the optimal equivalence ratio for flames containing carbon monoxide as an additive was 0.93. This was approximately the same optimal equivalence ratio as for pure hydrocarbon flames.

EXAMPLES 22–33

The polypropylene films of Examples 22–27 were flame treated as in Example 2 except that the distances between the tips of the luminous flame cones and the surface of the polypropylene film were varied from −1 mm to 6 mm as shown in Table 3. The polypropylene films of Examples 28–33 were flame treated as in Example 7 except that the distances were varied from 0 mm to 6 mm as shown in Table 3. All film samples were tested with the ASTM wetting test and the results are shown in Table 3.

TABLE 3

| Example | Distance | Wetting in mJ/m² |
|---|---|---|
| 22 | −1 | 52 |
| 23 | 0 | 66 |
| 24 | 1 | 68 |
| 25 | 2 | 66 |
| 26 | 3 | 62 |
| 27 | 6 | 60 |
| 28 | 0 | ≧72 |
| 29 | 1 | ≧72 |
| 30 | 2 | 70 |
| 31 | 3 | 69 |
| 32 | 4 | 64 |
| 33 | 6 | 60 |

As shown in Table 3, the optimal distance between the tips of the luminous flame cones and polypropylene film was 0–2 mm for hydrocarbon flames containing carbon monoxide as an additive. This was approximately the same optimal luminous-flame-to-film distance as for pure hydrocarbon flames.

EXAMPLES 34–42 AND COMPARATIVE EXAMPLE C7–C8

The polypropylene films of Examples 34–42 and Comparative Examples C7–C8 were flame treated as in Example 1 except that oxygen-containing alcohols having different percent atomic oxygen were used at various molar percents and at several equivalence ratios. In Examples 34–40, the oxygen-containing compound contained 16.7 percent atomic oxygen (methyl alcohol fuel with a stoichiometric ratio for dry air:methyl alcohol of 7.16:1 and a heat content of 32.2 kJ/L); it was used in the molar percents and equivalence ratios shown in Table 4. In Examples 41–42, the oxygen-containing compound contained 11.1 percent atomic oxygen (ethyl alcohol fuel with a stoichiometric ratio for dry air:ethyl alcohol of 14.32:1 and a heat content of 59.2 kJ/L); it was used in the molar percents and equivalence ratio shown in Table 4. In Comparative Examples C7–C8, the oxygen-containing compound contained 8.3 percent atomic oxygen (isopropyl alcohol fuel with a stoichiometric ratio for dry air:isopropyl alcohol of 21.48:1 and a heat content of about 89 kJ/L); it was used in the molar percent and equivalence ratios shown in Table 4.

All film samples were tested with the ASTM wetting test and select films were tested with the advancing and receding contact-angle test and ESCA. The results are shown in Table 4 together with those of Comparative Example C2.

TABLE 4

| Example | Equivalence Ratio | Alcohol (Percent) | Wetting (mJ/m$^2$) | Advancing Angle (Degrees) | Receding Angle (Degrees) | ESCA O/C Ratio |
|---|---|---|---|---|---|---|
| C2 | 0.93 | none | 61 | 89 | 28 | 0.11 |
| 34 | 0.93 | 2.0 | 64 | — | — | — |
| 35 | 0.93 | 5.0 | 64 | — | — | — |
| 36 | 0.93 | 10.0 | 67 | — | — | - |
| 37 | 0.95 | 10.0 | 69 | — | — | — |
| 38 | 0.93 | 20.5 | 69 | — | — | — |
| 39 | 1.03 | 20.5 | 67 | 87 | 22 | 0.14 |
| 40 | 1.03 | 33.0 | 66 | — | — | — |
| 41 | 0.98 | 1.7 | 64 | — | — | — |
| 42 | 0.98 | 5.2 | 68 | 89 | 18 | 0.15 |
| C7 | 0.98 | 5.4 | 59 | — | — | — |
| C8 | 0.95 | 20.4 | 60 | — | — | — |

The results in Table 4 show that an alcohol should contain at least about 10 percent atomic oxygen to be effective as an oxygen-containing compound that enhances the wettability of flame-treated biaxially oriented polypropylene.

EXAMPLES 43–46 AND COMPARATIVE EXAMPLE C9

The polypropylene films of Examples 43–46 and Comparative Example C9 were flame treated as in Example 1 except that oxygen-containing ketones having different percent atomic oxygen were used at various molar percents and several equivalence ratios. In Examples 43–46, the oxygen-containing compound contained 10.0 percent atomic oxygen (acetone fuel with a stoichiometric ratio for dry air:acetone of 19.10:1 and a heat content of about 89 kJ/L) and was used in the molar percents and equivalence ratios shown in Table 5. In Comparative Example C9, the oxygen-containing compound contained 7.7 percent atomic oxygen (2-butanone fuel with a stoichiometric ratio for dry air:2-butanone of 26.26:1 and a heat content of about 116 kJ/L); it was used in the molar percent and equivalence ratios shown in Table 5.

All film samples were tested with the ASTM wetting test and select films were tested with the advancing and receding contact-angle test and ESCA. The results are shown in Table 5 together with those of Comparative Example C2.

TABLE 5

| Example | Equivalence Ratio | Ketone (Percent) | Wetting (mJ/m$^2$) | Advancing Angle (Degrees) | Receding Angle (Degrees) | ESCA O/C Ratio |
|---|---|---|---|---|---|---|
| C2 | 0.93 | none | 61 | 89 | 28 | 0.11 |
| 43 | 0.98 | 5.4 | 69 | 84 | 18 | 0.15 |
| 44 | 0.98 | 7.8 | 67 | — | — | — |
| 45 | 0.98 | 10.5 | 69 | — | — | - |
| 46 | 0.98 | 20.4 | 68 | — | — | - |
| C9 | 0.98 | 5.4 | 60 | — | — | — |

The results in Table 5 show that a ketone should contain at least 10.0 percent atomic oxygen to be an effective oxygen-containing compound that enhances the wettability of flame-treated biaxially oriented polypropylene film surfaces. Use of 2-butanone, with 7.7 percent atomic oxygen, did not increase the wettability of the flame-treated surface over that treated with a flame from an oxidizer:fuel mixture that did not contain a ketone.

EXAMPLES 47–52 AND COMPARATIVE EXAMPLE C10

The polypropylene films of Examples 47–52 and Comparative Examples C10 were flame treated as in Example 1 except that oxygen-containing ethers having different percent atomic oxygen were used at various molar percents and several equivalence ratios. In Examples 47–52, the oxygen-containing compound contained 10.5 percent atomic oxygen (dimethyl ether fuel with a stoichiometric ratio for dry air:dimethyl ether of 14.32:1 and a heat content of 58.8 kJ/L); it was used in the molar percents and equivalence ratios shown in Table 6. In Comparative Example C10, the oxygen-containing compound contained 5.5 percent atomic oxygen (methyl-tert-butyl ether fuel with a stoichiometric ratio for dry air:methyl-tert-butyl ether of 35.8:1 and a heat content of about 148 kJ/L); it was used in the molar percent and equivalence ratios shown in Table 6.

All film samples were tested with the ASTM wetting test and select films were tested with the advancing and receding contact-angle test and ESCA. The results are shown in Table 6 together with those of Comparative Example C2.

TABLE 6

| Example | Equivalence Ratio | Ether (Percent) | Wetting (mJ/m$^2$) | Advancing Angle (Degrees) | Receding Angle (Degrees) | ESCA O/C Ratio |
|---|---|---|---|---|---|---|
| C2 | 0.93 | none | 61 | 89 | 28 | 0.11 |
| 47 | 0.93 | 1.7 | 63 | — | — | — |
| 48 | 0.93 | 3.4 | 66 | — | — | — |
| 49 | 0.93 | 5.2 | 66 | — | — | — |
| 50 | 0.93 | 10.5 | 66 | 88 | 21 | — |
| 51 | 0.95 | 10.5 | 68 | 87 | 22 | 0.14 |
| 52 | 0.95 | 100.0 | 66 | 90 | 25 | 0.13 |
| C10 | 0.98 | 5.4 | 57 | — | — | — |

As seen in Table 6, ethers should contain more than 10.0 percent atomic oxygen to be effective as oxygen-containing compounds that enhance the wettability and extent of surface oxidation of flame-treated biaxially oriented polypropylene when added to the oxidizer:fuel mixture during the flame treatment. Enhanced wettability was seen for molar percent dimethyl ether of from 1.7 to 100. Use of methyl-tert-butyl ether, with 5.5 percent atomic oxygen, did not enhance the wettability of polypropylene film over that which was flame treated with an oxidizer:fuel mixture that did not contain any ether.

EXAMPLES 53-72

The polypropylene films of Examples 53-72 were flame treated as in Example 1 except that a compound containing both 33.3 percent atomic oxygen and some nitrogen (nitrous oxide oxidizer) was used at various molar percents as shown in Table 7 and the equivalence ratio was 1.00.

All film samples were tested with the ASTM wetting test and select films were tested with the advancing and receding contact angle test and ESCA. The results are shown in Table 7 together with those of Comparative Example C2.

TABLE 7

| Example | N₂O (Percent) | Wetting (mJ/m²) | Advancing Angle (Degrees) | Receding Angle (Degrees) | ESCA O/C Ratio | ESCA N/C Ratio |
|---|---|---|---|---|---|---|
| C2 | none | 61 | 89 | 28 | 0.11 | 0.00 |
| 53 | 1.0 | 63 | — | — | — | — |
| 54 | 1.5 | 64 | — | — | — | — |
| 55 | 1.6 | 65 | — | — | — | — |
| 56 | 1.9 | 64 | — | — | — | — |
| 57 | 2.1 | 65 | — | — | — | — |
| 58 | 3.2 | 67 | — | — | — | — |
| 59 | 4.0 | 66 | 85 | 9 | 0.16 | 0.02 |
| 60 | 7.7 | 69 | 83 | 8 | 0.16 | 0.03 |
| 61 | 11.1 | 71 | — | — | — | — |
| 62 | 14.3 | ≧72 | 83 | 7 | 0.16 | 0.04 |
| 63 | 17.5 | ≧72 | — | — | — | — |
| 64 | 23.1 | ≧72 | 80 | 6 | 0.16 | 0.06 |
| 65 | 28.9 | ≧72 | 79 | 5 | 0.17 | 0.05 |
| 66 | 37.5 | 70 | 83 | 6 | 0.15 | 0.05 |
| 67 | 44.4 | 69 | — | — | — | — |
| 68 | 54.5 | 67 | 80 | 10 | 0.15 | 0.05 |
| 69 | 61.5 | 68 | — | — | — | — |
| 70 | 66.6 | 67 | 86 | 11 | 0.16 | 0.06 |
| 71 | 70.6 | 67 | 85 | 9 | 0.16 | 0.06 |
| 72 | 73.7 | 66 | — | — | — | — |

As seen from Table 7, flame treating using the addition of nitrous oxide in the oxider:fuel mixture was very effective in enhancing the wettability, extent of oxidation and extent of nitrogen affixation on the biaxially oriented polypropylene film surface when compared to flame treating with flames supported by natural gas and dry air. ASTM Wetting Test values of over 72 mJ/m² were obtained when nitrous oxide additive amounts were used of between about 14 and about 30 molar percent. In addition to increased oxidation, flames containing nitrous oxide also resulted in nitrogen being affixed to the film surface in the form of both oxidized-nitrogen (organic nitrates and/or nitrites) and reduced-nitrogen (amine, amide, imine and/or nitrile) functionalities. This added nitrogen may have contributed to the exceptional wettability observed on polypropylene film surfaces that were flame treated with flames supported by oxidizer:fuel mixtures that contained nitrous oxide. No surface nitrogen was observed on polypropylene films that were treated with flames supported by oxidizer:fuel mixtures that contained dry air and natural gas or that contained only oxygen-containing compound additives.

EXAMPLES 73-86

The polypropylene films of Examples 73-75 were flame treated as in Example 63 except that the equivalence ratios were varied from 0.93 to 1.02 as shown in Table 8. The polypropylene films of Examples 76-84 were flame treated as in Example 64 except that the equivalence ratios were varied from 0.80 to 1.20 as shown in Table 8. The polypropylene films of Examples 85-86 were flame treated as in Example 67 except that the equivalence ratios were varied from 0.97 to 1.02 as shown in Table 8. The polypropylene films of Examples 87-88 were flame treated as in Example 68 except that the equivalence ratios were varied from 0.93 to 1.12 as shown in Table 8. All film samples were tested with the ASTM wetting test and select films were tested with the advancing and receding contact angle test and ESCA. The results are shown in Table 8 together with those of Examples 63, 64, 67 and 68.

TABLE 8

| Example | Equivalence (Percent) | Wetting (mJ/m²) | Advancing Angle (Degrees) | Receding Angle (Degrees) | ESCA O/C Ratio | ESCA N/C Ratio |
|---|---|---|---|---|---|---|
| 73 | 0.93 | 58 | — | — | — | — |
| 74 | 0.97 | 71 | — | — | — | — |
| 63 | 1.00 | ≧72 | — | — | — | — |
| 75 | 1.02 | 10 | — | — | — | — |
| 76 | 6.80 | 42 | 97 | 51 | 0.07 | 0.02 |
| 77 | 0.85 | 46 | 96 | 38 | 0.12 | 0.02 |
| 78 | 0.93 | 66 | 85 | 10 | 0.18 | 0.05 |
| 79 | 0.95 | 69 | — | — | — | — |
| 80 | 0.97 | 71 | — | — | — | — |
| 64 | 1.00 | ≧72 | 80 | 6 | 0.16 | 0.06 |
| 81 | 1.02 | 71 | — | — | — | — |
| 82 | 1.04 | 66 | — | — | — | — |
| 83 | 1.12 | 60 | 87 | 15 | 0.08 | 0.02 |
| 84 | 1.20 | 43 | 98 | 37 | 0.06 | 0.02 |
| 85 | 0.97 | 66 | — | — | — | — |
| 67 | 1.00 | 69 | — | — | — | — |
| 86 | 1.02 | 68 | — | — | — | — |
| 87 | 0.93 | 64 | 86 | 12 | 0.13 | 0.05 |
| 68 | 1.00 | 67 | 80 | 10 | 0.15 | 0.05 |
| 88 | 1.12 | 65 | 91 | 18 | 0.12 | 0.05 |

As shown in Table 8, the optimal equivalence ratio for flames containing nitrous oxide as an additive was about 1.00. This was significantly more fuel rich than the optimal equivalence ratio for hydrocarbon flames supported by an oxidizer that contains only oxygen. This shift in the optimal equivalence ratio may have been related to the incorporation of nitrogen onto the polypropylene film surface and its subsequent effect on wettability. In addition, nitrogen was affixed onto the polypropylene film surface over a wide range of wettability modifications. Thus, one can beneficially affix nitrogen to the surface of polypropylene without necessarily increasing the wettability characteristics of the surface.

EXAMPLES 89-91 AND COMPARATIVE EXAMPLES C11-C12

The polymer films of Examples 89-91 were flame treated as in Examples 7, 51 and 65, respectively, except the films were 0.12 mm (4.8 mil) thick unoriented polyethylene. In Comparative Example C11, polyethylene film was not flame treated. In Comparative Example C12, polyethylene film was flame treated as the polypropylene film in Comparative Example C2. All film samples were tested with the ASTM wetting test and the advancing and receding contact-angle test, and selected film samples were tested with ESCA. The results are shown in Table 9.

TABLE 9

| Example | Wetting (mJ/m²) | Advancing Angle (Degrees) | Receding Angle (Degrees) | ESCA O/C Ratio | ESCA N/C Ratio |
|---|---|---|---|---|---|
| C11 | 34 | 104 | 86 | 0.01 | 0.00 |
| C12 | 56 | 82 | 33 | 0.12 | 0.00 |
| 89 | 59 | 76 | 26 | — | — |

TABLE 9-continued

| Example | Wetting (mJ/m$^2$) | Advancing Angle (Degrees) | Receding Angle (Degrees) | ESCA O/C Ratio | ESCA N/C Ratio |
|---|---|---|---|---|---|
| 90 | 60 | 77 | 16 | — | — |
| 91 | 62 | 78 | 10 | 0.15 | 0.04 |

As seen with all three flame additives, the wettability of the polyethylene films was enhanced over that achieved with flames that did not contain the additives. In addition, the advancing contact angles and the receding contact angles were decreased. Also, the presence of nitrous oxide in the flame caused the film surface to further oxidize and exhibit affixed nitrogen functionality.

EXAMPLES 92–93 AND COMPARATIVE EXAMPLES C13–C14

The polymer films of Examples 92–93 were flame treated as in Examples 51 and 65, respectively, except the films were 0.1 mm (4 mil) thick poly(ethylene terephthalate). In Comparative Example C13, poly(ethylene terephthalate) film was not flame treated. In Comparative Example C14, poly(ethylene terephthalate) film was flame treated as the polypropylene film in Comparative Example C2. All film samples were tested with the ASTM wetting test and the advancing and receding contact-angle test, and selected film samples were tested with ESCA. The results are shown in Table 10.

TABLE 10

| Example | Wetting (mJ/m$^2$) | Advancing Angle (Degrees) | Receding Angle (Degrees) | ESCA O/C Ratio | ESCA N/C Ratio |
|---|---|---|---|---|---|
| C13 | 42 | 86 | 50 | 0.38 | 0.00 |
| C14 | ≧72 | 49 | 13 | — | — |
| 92 | ≧72 | 44 | 10 | 0.43 | 0.03 |
| 93 | ≧72 | 44 | 13 | — | — |

As seen with all three flame-treated film samples, the wettability of the poly(ethylene terephthalate) films was increased by flame treatment to values in excess of 72 mJ/m$^2$. However, the addition of oxygen-containing or oxygen-nitrogen-containing additives further increased the wettability of the films as shown by the lower advancing and receding contact angles. Also, the presence of nitrous oxide in the flame caused the film surface to both further oxidize and exhibit affixed nitrogen functionality.

EXAMPLES 94–97 AND COMPARATIVE EXAMPLES C15–C18

The polymer films of Examples 94–97 were flame treated as in Example 65 except polymer films were 0.0625 mm (2.5 mil) thick polycarbonate, 0.0375 mm (1.5 mil) thick polystyrene, 0.0375 mm (1.5 mil) thick cellulose acetate and 0.0625 mm (2.5 mil) thick nylon, respectively. In Comparative Examples C15–C18, the polymer films were as in Examples 94–97, respectively, and were not flame treated. All film samples were tested with ESCA. The results are shown in Table 11.

TABLE 11

| Example | ESCA O/C Ratio | ESCA N/C Ratio |
|---|---|---|
| C15 | 0.23 | 0.00 |
| 94 | 0.30 | 0.04 |
| C17 | 0.00 | 0.00 |
| 95 | 0.17 | 0.05 |
| C14 | 0.38 | 0.00 |
| 96 | 0.63 | 0.03 |
| C18 | 0.20 | 0.16 |
| 97 | 0.30 | 0.20 |

As seen in Table 11, all of the various films that were flame treated with a flame that contained nitrous oxide exhibited both increased surface oxidation and affixed presence of nitrogen functionality.

EXAMPLES 98–107

The polypropylene films of Examples 98–107 were flame treated as in Example 1 except that a compound containing nitrogen but no oxygen (industrial grade ammonia fuel with a stoichiometric ratio for dry air:ammonia of 3.58:1 and a heat content of about 16.3 kJ/L) was used as a fuel substitute at various molar percents as shown in Table 12 and the equivalence ratio was 1.00.

All film samples were tested with the ASTM wetting test and select films were tested with the advancing and receding contact angle test and ESCA. The results are shown in Table 12 together with those of Comparative Example C2.

TABLE 12

| Example | NH$_3$ (Percent) | Wetting (mJ/m$^2$) | Advancing Angle (Degrees) | Receding Angle (Degrees) | ESCA O/C Ratio | ESCA N/C Ratio |
|---|---|---|---|---|---|---|
| C2 | none | 61 | 89 | 28 | 0.11 | 0.00 |
| 98 | 1.7 | 70 | 84 | 10 | 0.16 | 0.04 |
| 99 | 3.3 | 71 | 86 | 12 | 0.13 | 0.04 |
| 101 | 4.8 | 68 | — | — | — | — |
| 102 | 6.5 | 67 | — | — | — | — |
| 103 | 7.9 | 67 | 87 | 14 | 0.13 | 0.04 |
| 104 | 9.5 | 66 | — | — | — | — |
| 105 | 12.5 | 64 | — | — | — | — |
| 106 | 15.4 | 57 | — | — | — | — |
| 107 | 28.2 | 53 | — | — | 0.06 | 0.01 |

As seen from Table 12, flame treating using the addition of ammonia in the oxidizer:fuel mixture was effective in enhancing the wettability, extent of oxidation and extent of nitrogen affixation on the biaxially oriented polypropylene film surface when compared to flame treating with flames supported by natural gas and dry air. Additions of as little as 1.7 molar percent of ammonia resulted in ASTM Wetting Test values of 71 mJ/m$^2$. However, these values rapidly fall off with increased amounts of ammonia because ammonia additions to a flame decrease the temperature of the flame thus decreasing free radical formation. In addition to increased oxidation, flames containing ammonia also resulted in nitrogen being affixed to the film surface in the form of both oxidized-nitrogen (organic nitrates and/or nitrites) and reduced-nitrogen (amine, amide, imine and/or nitrile) functionalities. This added nitrogen was detected by ESCA at all concentrations of up to about 30 molar percent. No surface nitrogen was observed on polypropylene films that were treated with flames supported by oxidizer:fuel mixtures that contained dry air and natural gas or that contained only oxygen-containing compound additives.

EXAMPLES 108–120

The polypropylene films of Examples 108–113 were flame treated as in Example 99 except that the equivalence ratios were varied from 0.93 to 1.07 as shown in Table 13. The polypropylene films of Examples 114–120 were flame treated as in Example 103 except that the ratios were varied from 0.93 to 1.12 as shown in Table 13. All film samples were tested with the ASTM wetting test. The results are shown in Table 13 together with those of Examples 99 and 103.

TABLE 13

| Example | Equivalence Ratio | Wetting in mJ/cm$^2$ |
|---|---|---|
| 108 | 0.93 | 59 |
| 109 | 0.95 | 62 |
| 110 | 0.97 | 67 |
| 99  | 1.00 | 71 |
| 111 | 1.02 | 70 |
| 112 | 1.04 | 66 |
| 113 | 1.07 | 58 |
| 114 | 0.93 | 58 |
| 115 | 0.95 | 58 |
| 116 | 0.97 | 67 |
| 103 | 1.00 | 67 |
| 117 | 1.02 | 68 |
| 118 | 1.04 | 68 |
| 119 | 1.07 | 64 |
| 120 | 1.12 | 43 |

As shown in Table 13, the optimal equivalence ratio for flames containing ammonia as about 1.00 to 1.02. This was similar to the optimal equivalence ratio determined for flames containing nitrous oxide.

The various modifications and alterations of this invention will be apparent to those skilled in the art without departing from the scope and spirit of this invention and this invention should not be restricted to that set forth herein for illustrative purposes only.

We claim:

1. A method of modifying a polymeric substrate comprising exposing the polymeric substrate to a flame where the flame is supported by a fuel and oxidizer mixture that includes at least one compound which functions as a fuel substitute or an oxidizer substitute and is selected from a group consisting of a nitrogen-containing compound and an oxygen-nitrogen-containing compound.

2. The method of claim 1 wherein the nitrogen-containing compound is selected from ammonia, amine, cyanate, cyanide, hydrazine, cyanogen, urea, azide, carbon nitride or hydrazoic acid.

3. The method of claim 2 wherein the nitrogen-containing compound is ammonia, monomethylamine, dimethyl amine, trimethyl amine, monoethylamine, hydrogen cyanide, or hydrazoic acid.

4. The method of claim 1 wherein the oxygen-and-nitrogen-containing compound is, nitrogen oxide.

5. The method of claim 4 herein the oxygen-and-nitrogen-containing compound is nitrous oxide, nitric oxide, nitrogen dioxide, nitrous acid or nitric acid.

6. The method of claim 1 wherein the polymer substrate is a polyolefin, a mixture of polyolefin polymers, a copolymer of olefins, a polyolefin copolymer containing olefin segments, a polyester, an acetate, a polyamide or a mixture of polyamides, a polyurethane, a polycarbonate, an acrylic, a polystyrene or styrene-based copolymer, a vinylic, an ether oxide polymer, a ketone polymer, a silicone, an epoxy, a polyimide, a mixture thereof or a copolymer thereof.

7. The method of claim 6 wherein the polymer substrate is polyethylene, polypropylene, polybutylene, polymethylpentene, poly(ethylene vinylacetate), poly (ethylene methacrylate), poly(ethylene acrylic acid), poly (ethylene terephthalate), poly(butylene phthalate), poly (ethylene naphthalate), cellulose acetate, cellulose triacetate, cellulose acetate/butyrate, poly(hexamethylene adipamide), polyurethane, polycarbonate, poly(methyl methacrylate), polystyrene, styrene-based copolymer, poly(vinyl chloride), poly(vinyl dichloride), poly(vinyl alcohol), poly(vinyl butyral), poly(propylene oxide), poly(ethylene oxide), poly (methylene oxide), polyetheretherketone, polydimethylsiloxane, mixture thereof or copolymer thereof.

8. A modified polymeric substrate made by a method of treating a polymer substrate comprising exposing the polymer substrate to a flame where the flame is supported by a fuel and oxidizer mixture that includes an effective amount, for modifying the polymeric substrate, of at least one compound selected from a nitrogen-containing compound or an oxygen-nitrogen-containing compound and which functions as a fuel or oxidizer substitute.

9. The modified polymeric substrate of claim 8 wherein the substrate is a polyolefin, a mixture of polyolefin polymers, a copolymer of olefins, a polyolefin copolymer containing olefin segments, a polyester, an acetate, a polyamide or a mixture of polyamides, a polyurethane, a polycarbonate, an acrylic, a polystyrene or styrene-based copolymer, a vinylic, an ether oxide polymer, a ketone polymer, a silicone, an epoxy, a polyimide, a mixture thereof or a copolymer thereof.

10. The modified polymeric substrate of claim 9 wherein the polymer substrate is polyethylene, polypropylene, polybutylene, polymethylpentene, poly(ethylene vinylacetate), poly(ethylene methacrylate), poly(ethylene acrylic acid), poly(ethylene terephthalate), poly(butylene phthalate), poly(ethylene naphthalate), cellulose acetate, cellulose triacetate, cellulose acetate/butyrate, poly (hexamethylene adipamide), polyurethane, polycarbonate, poly(methyl methacrylate), polystyrene, styrene-based copolymer, poly(vinyl chloride), poly(vinyl dichloride), poly(vinyl alcohol), poly(vinyl butyral), poly(propylene oxide), poly(ethylene oxide), poly(methylene oxide), polyetheretherketone, polydimethylsiloxane, mixture thereof or copolymer thereof.

11. The modified polymeric substrate of claim 8 wherein the nitrogen-containing compound is selected from ammonia, amine, cyanate, cyanide, hydrazine, cyanogen, urea, azide, carbon nitride or hydrazoic acid.

12. The modified polymeric substrate of claim 11 wherein the nitrogen-containing compound is ammonia, monomethylamine, dimethyl amine, trimethyl amine, monoethylamine, hydrogen cyanide or hydrazoic acid.

13. The modified polymeric substrate of claim 8 wherein the oxygen-and-nitrogen-containing compound is a nitrogen oxide.

14. The modified polymeric substrate of claim 13 wherein the oxygen-and-nitrogen-containing compound is nitrous oxide, nitric oxide, nitrogen dioxide, nitrous acid or nitric acid.

* * * * *